April 27, 1943. E. W. FULLER 2,317,903
DRIVE MECHANISM
Filed April 2, 1941
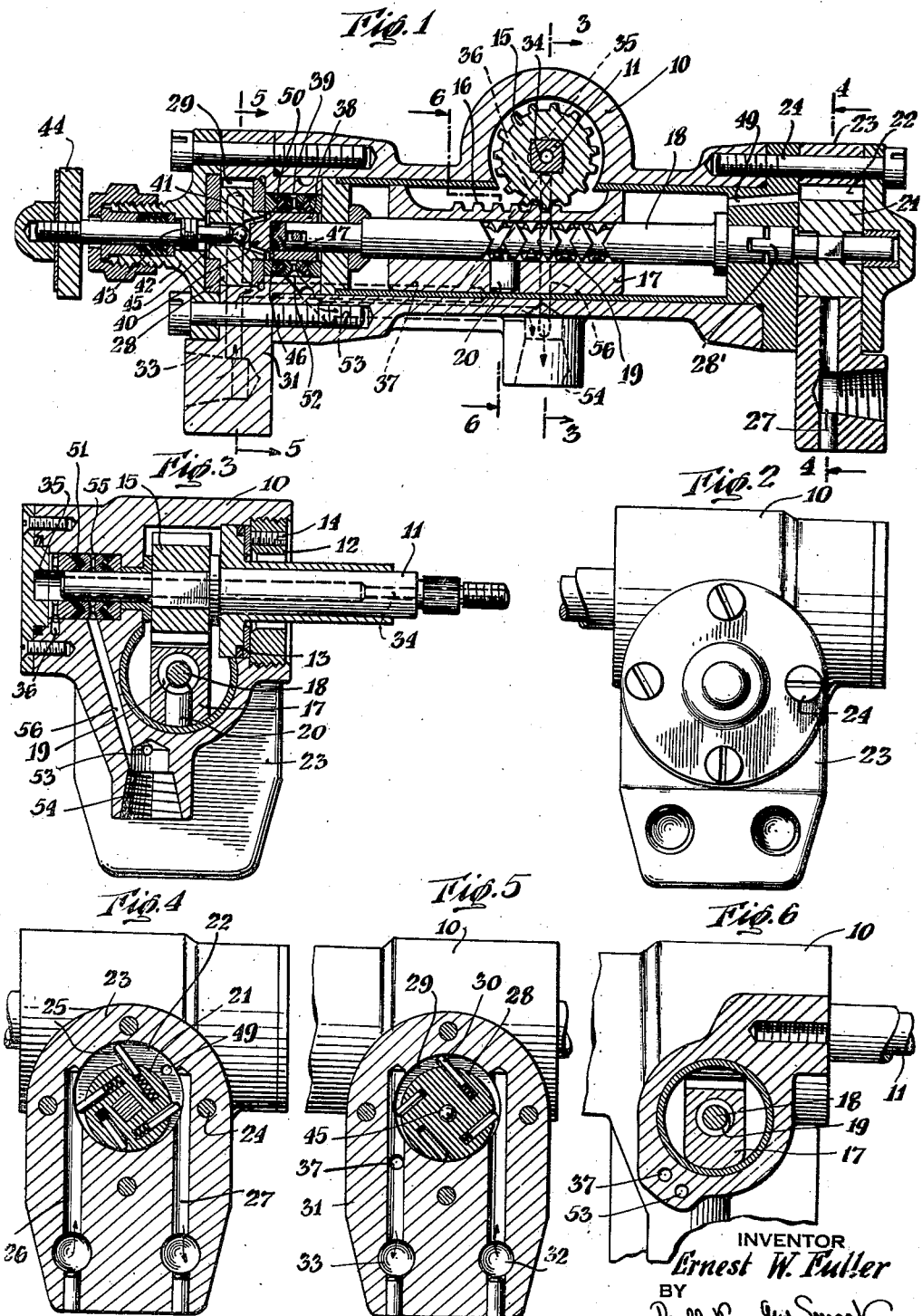
INVENTOR
*Ernest W. Fuller*
BY
*Duell, Kaue and Smoot*
ATTORNEYS Patented Apr. 27, 1943

2,317,903

UNITED STATES PATENT OFFICE 2,317,903

DRIVE MECHANISM

Ernest W. Fuller, Shaker Heights, Ohio, assignor to The Acrotorque Company, Cleveland, Ohio, a corporation of Connecticut Application April 2, 1941, Serial No. 386,399

3 Claims. (Cl. 15—250.4)

This invention relates to a structurally and functionally improved drive mechanism and especially, a mechanism which is intended for the cleaning of windshields and for similar purposes.

It is an object of this invention to furnish a mechanism of this character and which will be of particular utility when employed in connection with aircraft; it being intended that the present application will disclose a structure, which in certain respects will be an improvement over that disclosed in my earlier application for United States Letters Patent entitled Drive mechanism, filed in Washington on February 18, 1941, and identified under Serial No. 379,538.

A further object of the invention is that of designing a mechanism which in common with my aforeidentified application will include a fluid distributing structure. However, by means of the present invention, this structure will be capable of being readily controlled by the pilot or other operator so that, fluid such as alcohol may be optionally distributed as a function auxiliary to the operation of the wiper mechanism.

An additional object is that of providing a windshield wiper mechanism embodying a structure, such that there will be no danger of the various fluids passing therethrough intermingling. In other words, if oil or similar liquid under pressure is depended upon to operate the motor mechanism of the wiper, and if as an auxiliary function of such wiper, there is distributed by the same mechanism, fluid such as alcohol, the present invention contemplates the prevention of any possibility of these fluids becoming intermixed. Consequently, no fear need be felt as to the windshield or other surface to be cleaned becoming smeared with oil, nor need the operator be concerned about the possibility of injury to the mechanism, because of alcohol entering into the circulatory system containing the oil or other operating fluid.

Still another object is that of furnishing a mechanism of this character which will embody relatively few parts, each individually simple and rugged in construction and capable of ready production and assembly; the mechanism functioning over long periods of time with freedom from all difficulties and being at all times under the ready control of the operator.

With these and other objects in mind, reference is had to the attached sheet of drawings illustrating one practical embodiment of the invention and in which:

Fig. 1 is a longitudinal section taken through a drive mechanism;

Fig. 2 is an end view of the unit; and

Figs. 3, 4, 5 and 6 are transverse sectional views taken along the lines 3—3, 4—4, 5—5 and 6—6, respectively and in the direction of the arrows indicated in Fig. 1.

In these views, the reference numeral 10, indicates the body or housing portion of the unit which may be conveniently formed of any suitable material and from which a shaft 11 extends. The latter, in accordance with any desired and acceptable practice, may serve to oscillate or otherwise operate any desired number of wiping blades or elements (not shown). These traverse the surface to be cleaned in order to maintain the latter in a visually transparent condition. As in well understood, body 10 may be conveniently mounted within the interior of an airplane cockpit and shaft 11 may extend through the skin of the ship and beyond the same. Such shaft may moreover be maintained in position by, for example, a nut 12 with which packing 13 may be associated; the nut being locked by a set screw 14. In this manner, it will be apparent that the entrance of foreign material will be prevented.

Secured to shaft 11 and within the interior of body 10 is a pinion 15, the teeth of which mesh with a rack 16. This rack forms a part of a sleeve 17 encircling a shaft 18 and a rotation of these parts around this shaft may be prevented by the width of the intermeshing teeth. The shaft is formed with a pair of spirally extending grooves 19, the ends of which are joined to each other to provide, in effect, an endless worm feed. A pin 20 is mounted by the sleeve and extends into the groove, so that, while shaft 18 rotates in one direction, the sleeve is caused to reciprocate back and forth along the said shaft.

With a view to effecting rotation of the shaft, the latter may be rotatably supported adjacent the ends of body 10. Conveniently, a driving motor for this shaft is housed within or forms a part of body 10.

Thus, it is only necessary to couple one end of the shaft to the motor. The latter may include a rotor 21 which is eccentrically disposed within a chamber 22, forming a part of an extension on end housing 23 coupled to body 10, as for example, by bolts 24. The rotor 21 is provided with a series of spring pressed vanes or blades 25. These have a lap fit with the wall of the chamber, and it is obvious that with fluid entering through duct 26 and flowing outwardly through duct 27, a rotation of the rotor 21 will follow.

Such rotation will be transmitted through the coupling 28' to shaft 18. On the other hand, it will be appreciated that this shaft might be driven by a source of remotely located power rather than by a motor which is disposed immediately adjacent the body 10. If such an alternative structure were desired, the teachings traversed in my earlier application as identified above, might be followed.

It is proposed that in accordance with the teachings of the earlier application, a fluid distributing pump or structure will be provided as part of the windshield wiping mechanism. One form of structure suitable for the achievement of this purpose has been illustrated, especially in Figs. 1 and 5. In these views, it will be seen that the numeral 28 indicates a rotor eccentrically disposed within a chamber 29 and which rotor carries a plurality of vanes or blades 30, which may be spring pressed. The chamber 29 forms a part of a body 31 and the latter is provided with an inlet duct 32 and an outlet duct 33. The former is connected to a suitable source of supply for fluid such as alcohol, and the latter may be connected by a structure (not shown) such, that fluid will be distributed adjacent to and in the path of travel of the squeegee or wiping element employed to clean the windshield or panel.

It is preferred however, in accordance with the present invention, instead of generally distributing this fluid, that it should be passed through the operating shaft 11. With this thought in mind, the said shaft is formed with a bore 34, the outer end of which may communicate with a channel or tube portion forming a part of the wiping arm (not shown) or be otherwise directly associated with the same. Fluid enters the bore 34 by having the inner or rear end of the latter communicate with a space 35. Also connecting with this space is a passage 36 which in turn is connected to a passage 37, the latter being coupled with passage 33. Consequently, it is obvious that the fluid distributed by the pump will flow through passages 33, 37, 36 and so into space 35. Thence, it will flow through the bore 34. If such distribution of the fluid is not desired, it is of course, apparent that these passages need not be provided or may simply be plugged up and that—as afore brought out—a suitable coupling may be provided in association with the channel or passage 33, to receive the fluid.

It might be desired to have the windshield wiping mechanism operating without distributing fluid. Under such circumstances, the rotor 28 should be rendered inoperative despite the continued operation of shaft 18. To secure this result, a clutch is employed, by means of which these parts may be coupled and uncoupled. The structure here employed preferably follows that shown in the drawings and may include a sleeve 38, slidably mounted on the end of shaft 18, and secured against rotation with respect to the same, by means of a cross pin 39. The end of this sleeve is constructed to provide a clutch portion 40 which may bear into a correspondingly shaped recess or clutch portion 41 conveniently forming a part of the rotor 28.

In order to operate the clutch, the end of the body adjacent the pump is extending as indicated at 42. Mounted for rotation in this extension is a rod threaded as at 43. This rod may be turned by a knurled nut or knob 44. A spherical element 45 may be interposed between the inner end of the rod and the adjacent end of the sleeve 38.

It follows, that with the rod retracted (i. e. moved to the left as viewed in Fig. 1) the sphere 45 may move similarly in which case, clutch parts 40 and 41 will be free to engage. Accordingly, the rotor 28 will move in unison the shaft 18, if these clutch parts are engaged. To assure such engagement, a spring washer 46 is interposed between the base of the sleeve 38 and the end of shaft 18. This spring washer may be of concave shape and a stop member 46 may in turn be interposed between its body and the end of the shaft. This stop will prevent an over-stressing of the washer in the event that knob 44 is turned too great an extent to correspondingly retract the sleeve 38 along the shaft. Consequently, the parts will not become injured if such an operation is resorted to. Conversely however, as soon as knob 44 is turned to allow of an engagement of the clutch part, the spring washer 46 will cause such engagement.

Where it is desired to employ two fluids—as in the present structure—great care must be exercised to prevent any possibility of these fluids becoming intermingled. In this connection, it will be obvious that should a certain amount of alcohol or similar liquid escape into the fluid circuit which is employed to drive the rotor 21 or a similar motor mechanism, that numerous difficulties and damage to the parts will occur. Conversely, it is apparent, if oil or similar operating fluid should be distributed with the alcohol to a position where it would coat the windshield, the result would be most unsatisfactory. The possibilities of such conditions occurring are multiplied by the fact that it is necessary, or at least desirable to lubricate the shaft 18 and the sleeve 17 traversing the same, as well as the adjacent connected parts. For this reason, a source of lubricant is provided, for example, through a bore 49 which extends from chamber 22 through to a point above shaft 18 whence it will be distributed to the mechanism to be lubricated. Moreover, this lubricant will be free to accumulate in what might be termed the "sump portion" of the unit. Consequently, the parts will operate in the body of lubricant thus provided.

Now, as shown, both shafts 18 and 11 may be provided with suitable packing assemblies indicated respectively at 50 and 51, and in order to prevent any intermingling of the fluids. Both of these assemblies may be of the expanding type, so that by increasing the pressure, the density of the packing and the effectiveness of the seal is increased. Additionally, however, packing 50 may be provided with a groove 52 into which will flow any alcohol which might be tending to flow from the pump towards the shaft 18. From this groove or channel, a duct 53 extends and the latter communicates with an outlet 54. Similarly, packing 51 is formed with a groove 55 in communication with a channel 56 also coupled to the outlet 54. This outlet may be connected by tubes (not shown) with the atmosphere so that any and all products discharged therefrom may freely escape from the mechanism.

With a structure of this type, it is apparent that a pilot may initiate operation of the mechanism by simply permitting fluid to flow into channel 26 and be discharged through channel 27. As a consequence of such flow, the rotor 21 will begin to turn and a corresponding movement will be imparted to shaft 18. This movement will result in the reciprocation of sleeve 17 along the shaft and with a corresponding oscillation on the part of pinion 15 and shaft 11. The movement of the latter shaft will cause the blade or blades to be oscillated or otherwise shifted over a surface to be cleaned.

As afore brought out, the parts of the mechanism will be adequately lubricated by the limited flow which will occur through duct 49 or by any other suitable expedient. In fact, if the motor be remotely located, a number of structures will suggest themselves to those skilled in the art whereby adequate lubrication of the sleeve, shaft, pinion, etc., could be effected. When the pilot desires to initiate operation of the mechanism so that alcohol or similar fluid will be distributed, he may effect the desired results by simply turning knob 44 to allow clutch parts 40 and 41 to engage. Alcohol will now be drawn through duct 32 and discharged through duct 33 outwardly through passage 37, and so through the bore 34 of the shaft 11. In no event, however, need any concern be felt as to the danger of the alcohol or any corresponding fluid being introduced into the fluid circuit through which the motor is operated, nor need there be any fear as to oil or similar fluid from the latter circuit entering into the alcohol or de-icing fluid circuit.

Thus among others, it will be understood that the objects specifically aforenoted are achieved. Obviously numerous changes in construction and rearrangement of the parts might be resorted to without departing from the spirit of the invenition as defined by the claims.

I claim:

1. In combination, an elongated casing including a rotatable shaft therein adapted to be power driven, a second shaft arranged transverse to the first shaft and adapted to drive a wiper, means for connecting said first and second shafts whereby in response to movement of the first, said second shaft will oscilate, a liquid pump structure adapted to deliver liquid to the wiper comprising a rotor, presenting a clutch part, a sleeve associated with said first named shaft and also presenting a clutch part cooperable with said rotor, manually controllable means for shifting said clutch parts to positions at which they will be disengaged and resilient means interposed between said sleeve and said first named shaft for constantly urging such clutch parts into engaged positions, said pump being disposed adjacent one end of said casing.

2. A mechanism of the character described including in combination, a shaft to be power operated, a second shaft formed with a bore, means whereby said second shaft will be operated in response to movement of said first named shaft, a pump coupled to said first named shaft and to be operated thereby, said pump having an outlet connecting with the bore of said second shaft, an enclosing structure for said shafts said enclosing structure formed with an outlet and means for diverting fluid moving exteriorly over either of said shafts to said latter outlet.

3. A mechanism of the character described including in combination, a shaft to be power operated, a second shaft formed with a bore, means whereby said second shaft will be operated in response to movement of said first named shaft, a pump coupled to said first named shaft and to be operated thereby, said pump having an outlet connecting with the bore of said second shaft, an enclosing structure for said shafts and formed with an outlet, packings associated with said shafts whereby to prevent a flow of fluid over either of the same and said mechanism being provided with passages extending from said packings to said shaft enclosing structure outlet whereby any fluid flowing to said packings will be diverted to said latter outlet.

ERNEST W. FULLER.